(12) United States Patent
Yang

(10) Patent No.: US 9,651,383 B2
(45) Date of Patent: May 16, 2017

(54) METHOD AND SYSTEM FOR CREATING INDOOR AND OUTDOOR LINKED PATH

(71) Applicant: HYUNDAI MNSOFT, Inc., Seoul (KR)

(72) Inventor: Hyun Jong Yang, Seoul (KR)

(73) Assignee: HYUNDAI MNSOFT, INC., Seoul (KR)

( * ) Notice: Subject to any disclaimer, the term of this patent is extended or adjusted under 35 U.S.C. 154(b) by 68 days.

(21) Appl. No.: 13/688,519

(22) Filed: Nov. 29, 2012

(65) Prior Publication Data

US 2013/0144525 A1 Jun. 6, 2013

(30) Foreign Application Priority Data

Dec. 12, 2011 (KR) .................. 10-2011-0133140

(51) Int. Cl.
*G01C 21/20* (2006.01)
*G01C 21/34* (2006.01)
*G01C 21/36* (2006.01)

(52) U.S. Cl.
CPC ....... *G01C 21/206* (2013.01); *G01C 21/3407* (2013.01); *G01C 21/3688* (2013.01)

(58) Field of Classification Search
CPC .... G01C 21/206; G01C 21/20; G01C 21/165; G01C 21/16; G01C 21/32; G01C 17/38; G01C 21/00; G01C 21/3682; G01C 21/3688; H04W 64/00; H04W 4/02; H04W 40/20; H04W 4/043; H04W 80/04; H04W 8/26; H04W 48/08; H04W 4/023; G01S 19/49; G01S 5/0252; G01S 19/48; G01S 19/34; G01S 5/02; G01S 19/39

USPC ....... 701/433, 446, 410, 469, 495, 400, 413, 701/518; 455/456.1, 41.2, 456.6, 457, 455/415, 450; 340/995.1, 995.14, 995.19, 340/988, 995.2

See application file for complete search history.

(56) References Cited

U.S. PATENT DOCUMENTS

| 6,124,826 | A | 9/2000 | Garthwaite et al. | |
|---|---|---|---|---|
| 8,712,686 | B2* | 4/2014 | Bandyopadhyay et al. .. | 701/446 |
| 2001/0041960 | A1* | 11/2001 | Hashida ........................ | 701/207 |
| 2003/0055556 | A1* | 3/2003 | Hashida ........................ | 701/207 |
| 2003/0060978 | A1* | 3/2003 | Kokojima et al. ............ | 701/211 |
| 2004/0143388 | A1* | 7/2004 | Yano et al. .................... | 701/209 |
| 2004/0193365 | A1* | 9/2004 | Kokojima et al. ............ | 701/201 |
| 2005/0114016 | A1* | 5/2005 | Kim et al. ..................... | 701/208 |
| 2006/0293839 | A1* | 12/2006 | Stankiewcz et al. ......... | 701/200 |
| 2007/0219708 | A1* | 9/2007 | Brasche et al. ............... | 701/207 |

(Continued)

FOREIGN PATENT DOCUMENTS

| KI | 10-2011-0096321 | 8/2011 |
|---|---|---|
| WO | 01/54021 | 7/2001 |

OTHER PUBLICATIONS

European Search Report dated Mar. 28, 2014 cited in Application No. 12195268.3.

*Primary Examiner* — Truc M Do
(74) *Attorney, Agent, or Firm* — Bacon & Thomas, PLLC

(57) ABSTRACT

A user terminal finds an outdoor path up to an outdoor access point of a building in which a destination is located, using an outdoor map. The user terminal receives an indoor map of the building to find an indoor path up to the destination from an indoor access point of the building using the indoor map. The user terminal reflects the indoor path to the outdoor path to create an outdoor and indoor linked path.

5 Claims, 5 Drawing Sheets

(56) References Cited

U.S. PATENT DOCUMENTS

| | | | |
|---|---|---|---|
| 2008/0266106 A1* | 10/2008 | Lim et al. | 340/572.7 |
| 2009/0043504 A1* | 2/2009 | Bandyopadhyay et al. | 701/213 |
| 2009/0138353 A1* | 5/2009 | Mendelson | 705/14 |
| 2009/0198443 A1* | 8/2009 | Yamazaki | G01C 21/3685 701/414 |
| 2010/0023249 A1* | 1/2010 | Mays et al. | 701/200 |
| 2010/0023252 A1* | 1/2010 | Mays et al. | 701/201 |
| 2010/0121567 A1* | 5/2010 | Mendelson | 701/206 |
| 2010/0125409 A1* | 5/2010 | Prehofer | 701/207 |
| 2010/0161370 A1* | 6/2010 | Bloom | 705/9 |
| 2010/0299065 A1* | 11/2010 | Mays | 701/209 |
| 2011/0080848 A1* | 4/2011 | Khorashadi et al. | 370/254 |
| 2011/0082638 A1* | 4/2011 | Khorashadi et al. | 701/200 |
| 2011/0172906 A1* | 7/2011 | Das et al. | 701/201 |
| 2012/0016578 A1* | 1/2012 | Coppens | 701/201 |
| 2012/0072110 A1* | 3/2012 | Venkatraman | 701/434 |
| 2012/0101727 A1* | 4/2012 | Mays et al. | 701/533 |
| 2012/0130632 A1* | 5/2012 | Bandyopadhyay et al. | 701/446 |
| 2012/0166147 A1* | 6/2012 | Kwak | 703/1 |
| 2012/0203453 A1* | 8/2012 | Lundquist et al. | 701/434 |
| 2012/0239332 A1* | 9/2012 | Keene et al. | 702/94 |
| 2013/0096885 A1* | 4/2013 | Gupta | 703/1 |

* cited by examiner

METHOD AND SYSTEM FOR CREATING INDOOR AND OUTDOOR LINKED PATH

FIELD OF THE INVENTION

The present invention relates to a method and system for creating an indoor and outdoor linked path, and more specifically to a method and system for downloading an indoor map and finding a path in a user terminal in which the indoor map is not stored.

BACKGROUND OF THE INVENTION

Generally, a navigation system for vehicles is associated with GPS satellites providing position information of the vehicle provides a map with a path to a destination to which the vehicle wishes to get, and displays position and moving speed of the vehicle driving on the path, thereby providing correct drive information to a user.

Such a navigation system provides a user who is not familiar with road information or is not yet well-informed of a road situation that becomes complicated more and more with urban development, with information on a precise path to a destination and a drive guide. Due to its convenience, a lot of drivers have the navigation system and the trend is that its distribution is rapidly extending. In the navigation system, further, a variety of service functions is being developed other than a simple path guide, including DMB (Digital Multimedia Broadcasting) reception and movie playback.

In addition, the navigation system is currently mounted in kinds of moving objects such as ships, aircrafts, and cars and is widely used to identify current position and speed of the moving objects or determine their moving path. Especially, the navigation system receives radios representing latitude, longitude and altitude from a plurality of GPS satellites and calculates a current location of the navigation system to visually display map information including its current position or audibly indicate the information.

Generally, the navigation system, which may be embodied in a form of a terminal for vehicles or a smart terminal such as a smart phone capable of receiving GPS signals, can perform functions such as including a storage medium such as a hard disk drive (HDD) that stores map data and a GPS receiver unit for receiving GPS signals, calculating an optimum drive path when a navigation function is required, and generating path data resulted from the calculation for presenting to a user.

Korean laid-open Patent No. 10-2011-0096321 suggests an apparatus and method for providing driving path using indoor map information. However, in case that a destination is an indoor location, there are problems that it is not possible to receive GPS signals using a conventional navigation system and to guide a user to a destination when an indoor map for the building is not stored.

SUMMARY OF THE INVENTION

In view of the above, the present invention provides a method for linking an indoor map and an outdoor map to find a path, in case that a destination of an indoor location is requested by a user.

Further, the present invention provides a method to find a path to a destination of an indoor location in case that an outdoor map only is stored in a user terminal.

Further, the present invention suggests a method to find a path to a destination of an indoor location by reflecting an outdoor path to an indoor path or an indoor path to an outdoor path.

In accordance with an aspect of the present invention, there is provided a method for finding a destination in a user terminal, which includes: finding an outdoor path up to an outdoor access point of a building in which the destination is located, using an outdoor map; receiving an indoor map of the building; finding an indoor path up to the destination from an indoor access point of the building using the indoor map; and reflecting the indoor path to the outdoor path to create an outdoor and indoor linked path.

In accordance with another aspect of the present invention, there is provided a user terminal, which includes: a first storage for storing an outdoor map; a path finding unit configured to find an outdoor path using the outdoor map up to an outdoor access point of a building when the destination is located at an indoor location within the building, find an indoor path up to the destination from an indoor access point of the building using an indoor map, and reflect the indoor path to the outdoor path to create an outdoor and indoor linked path; a communication unit configured to receive the indoor map of the building; and a path providing unit configured to provide the outdoor and indoor linked path to a user.

An exemplary method for finding a path to a destination by linking an indoor map and an outdoor map finds an outdoor path up to a near destination using an outdoor map stored in a user terminal, and creates an outdoor and indoor linked path to the destination using an indoor map. As such, an exemplary embodiment of the present invention rapidly provides a user with a path to a destination of an indoor location by a sequential process of finding an outdoor path using an outdoor map, finding an indoor path using an indoor map, and reflecting the indoor path to the outdoor path to create an outdoor and indoor linked path.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
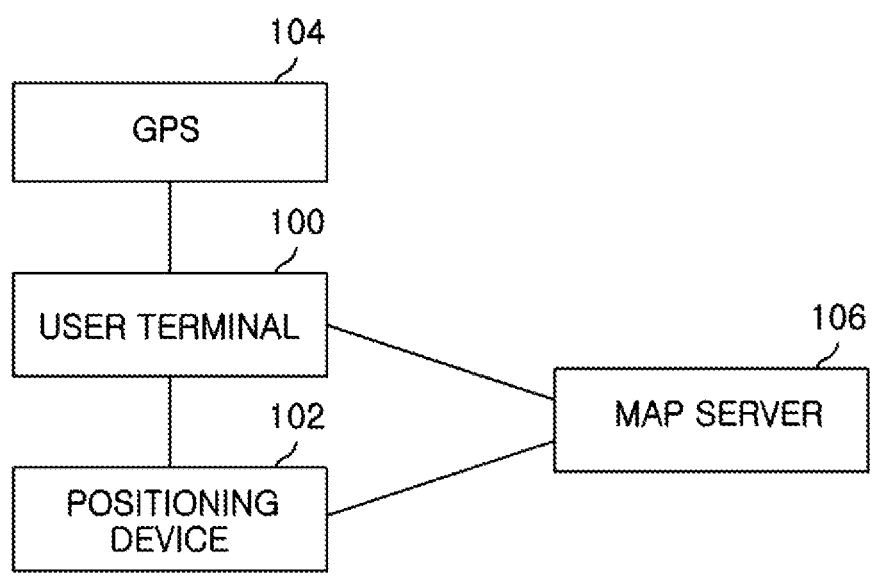
FIG. 1 shows a system for creating an indoor and outdoor linked path in accordance with an embodiment of the present invention.

FIG. 1 shows a system for creating an indoor and outdoor linked path in accordance with an embodiment of the present invention. Hereinafter, the system for creating an indoor and outdoor linked path in accordance with an embodiment of the present invention will be described in detail with reference to FIG. 1.

The term "indoor" in embodiments of the present invention may refer to areas where GPS signals are not received such as inside of buildings, an area or a space that is attached to a building, e.g., an outdoor parking lot or a space between buildings, ships, trains and the like. Further, the indoor may include particular regions or spaces that are requested and specified by a user other than the above places.

Referring to FIG. 1, a system for creating an indoor and outdoor linked path includes a user terminal 100, a map server 106, a GPS 104 and a positioning device 102. Of course, it will be understood that the system may include other construction than the above described one.

The user terminal 100 is provided with an outdoor map from a map server 106 for storing it. The user terminal 100 may not store the outdoor map before finding the path. When a user requests to find an outdoor path to a destination of an outdoor location through an input unit, the user terminal 100 provides a path to the destination of an outdoor location using the outdoor map stored therein. However, when the user terminal 100 does not have the outdoor map stored therein, it may request the map sever 106 to transmit the outdoor map.

Meanwhile, when the user requests to find an indoor path to a destination of an indoor location, the user terminal 100 provides a path to the destination of an indoor location using the outdoor map. In this case, however, the user terminal 100 finds an outdoor path obtained using the outdoor map, but it does not find an indoor path. This is because that the user terminal 100 stores the outdoor map only, but not an indoor map. Therefore, although the user terminal can find an outdoor path obtained using the outdoor map, it cannot find an indoor and outdoor linked path which is ultimately required by a user. Accordingly, in case that a destination requested by a user is an indoor location within a building, the user terminal 100 first finds an outdoor path up to the building using the outdoor map.

The user terminal 100 then provides a user with the found outdoor path via a display unit. Thereafter, the user terminal 100 requests an indoor map of the building to the map server 106. In response to the request, the user terminal 100 is supplied with a 2-dimensional map or 3-dimensional map of the building from the map server 106. Of course, the user terminal 100 may be provided with both of the 2-dimensional map and 3-dimensional map of the building from the map server 106. In this case, it is preferred that the user terminal 100 is supplied with the 2-dimensional map first and then the 3-dimensional map for a rapid indoor path search.

When completing the reception of the indoor map while the outdoor path is guided, the user terminal 100 creates the outdoor and indoor linked path up to the destination of the indoor location to which the indoor path derived from the indoor map is reflected. In this case, the user terminal 100 may create the outdoor and indoor linked path to which an indoor path is reflected partially using an outdoor path found previously.

A path to be found may differ depending on whether a user is traveling by vehicle or on foot. For example, when the user is driving a vehicle, the user terminal may find a parking lot nearest to the destination first, find a path to the searched parking lot from a current location and then find a path to the destination from the parking lot. On the contrary, when the user is moving on foot, the user terminal may find an entrance nearest to the destination first, find a path to the searched entrance from a current location, and then find a path to the destination from the entrance.

As such, the user terminal 100 may find an outdoor path using the outdoor map stored in advance, and then find an entire path in which an indoor path found using the indoor map received after that is reflected to the outdoor path.

The map server 106 serves to provide the user terminal 100 with map data. The map server 106 stores indoor map data and outdoor map data to be provided to the user terminal 100. If necessary, the map server 106 may store 2-dimensional map data and 3-dimensional map data for each building. When the map server 106 receives a request for an indoor map of a specific building from the user terminal 100, it extracts the indoor map of the specific building among the map data. The map server 106 then provides the user terminal 100 with the extracted indoor map. Alternatively, when extracting a 2-dimensional indoor map and a 3-dimensional map of the specific building, the map server 106 may transmit the 2-dimensional indoor map of which the amount of data is small first, and then the 3-dimensional indoor map after the transmission of the 2-dimensional indoor map in order to find the indoor path quickly.

Further, the map server 106 may provide a variety of map services according to the location of the user terminal 100. For example, the map server 106 may provide an indoor map or an outdoor map using position information of the user terminal 100, and may provide an indoor and outdoor linked map when it is needed. The map server may provide the user terminal 100 with an indoor map of a building when the user terminal 100 is located indoor. To do it, the map server 106 determines whether the user terminal 100 is located at an indoor location or an outdoor location, by help of the positioning device 102 with which the user terminal 100 is communicating.

The positioning device 102 is generally installed in the interior of a building and communicates with the user terminal 100. The positioning device 102 provides information requested by the user terminal 100 while communicating with the user terminal 100. If necessary, the information may be provided from the user terminal 100 to an external server. For example, the positioning device 102 may provides map data to the user terminal 100, and receive map service based information from the user terminal 100 and relay it to the map server 106.

The GPS 104 functions to determine a current location of the user terminal 100 when the user terminal 100 is out of the door. That is, the user terminal 100 determines the current location using information received from the GPS 104.

Figure 2:
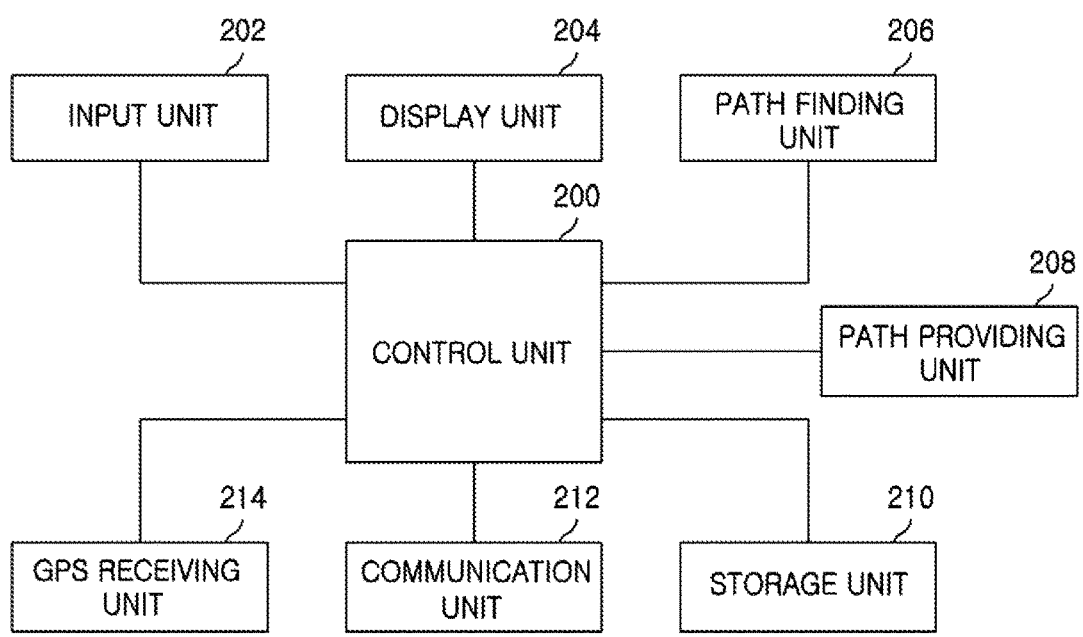
FIG. 2 is a block diagram of the user terminal shown in FIG. 1.

FIG. 2 is a block diagram of the user terminal shown in FIG. 1.

Referring to FIG. 2, the user terminal 100 includes an input unit 202, a display unit 204, a path finding unit 206, a control unit 200, a storage unit 210, a communication unit 212, a GPS receiver unit 214, a path providing unit 208. It is understood to those skilled in the art that the user terminal may include other components than those described above.

The GPS receiver unit 214 communicates with the GPS 104 under an outdoor environment where GPS signals are received. The GPS receiver unit 214 sends communications with the GPS 104 to the control unit 200.

The communication unit 212 communicates with the positioning device 102 if it is possible, and communicates with an external server using a mobile communication network if it is not possible to communicate with the positioning device. Of course, the communication may be performed using a mobile communication network even when the communication unit 212 communicates with the positioning device. Also, the communication unit 212 receives the map data to be displayed on the display unit 204 of the user terminal 100, from the map server 106. That is, the communication unit 212 communicates with the map server 106 in order to find a path or obtain necessary information. The display unit 204 displays the path on the map under a control of the control unit 200. If necessary, the display unit 204 may display both of the 2-dimensional map and 3-dimensional map on one screen. Additionally, the display unit 204 may display information requested by the user and provided by the map server 106.

The input unit 202 may be implemented in a form of a keyboard or a touch pad to input data from the user. The display unit having a form of a touch screen can perform a function of the input unit 202. The input unit 202 receives information on a target destination from the user or a variety of information needed for path findings and other map-related services. The input unit 202 may be integrally formed in one body with the user terminal 100 or may be separately equipped on the user terminal 100 if necessary.

The storage unit 210 stores information necessary to drive the user terminal 100. According to the embodiments, the storage 210 stores the map data received from the map server 106. As described above, the map data may be embodied in a form of 2-dimension or 3-dimension data, which may be stored in separate storage spaces in the storage unit 210. In other words, the storage unit 210 stores the 2-dimensional map and 3-dimensional map in separate storage spaces, and stores an identifier for a specific area within the 2-dimensional map and an identifier for a specific area within the 3-dimensional map. Further, it is possible to link and store the same areas in the 2-dimensional map and the 3-dimensional map. As such, when the same areas are linked, it is possible to rapidly display the same areas in the 2-dimensional map and the 3-dimensional map. In addition, the indoor map and the outdoor map stored in the storage unit 210 may be differently managed by a removal period or a removal policy. The outdoor map may not be removed until it is newly updated at a predetermined interval and the indoor map may be removed shortly after completing the path finding of the destination of inner location or the guidance to the destination of inner location. Alternatively, the inner map may not be removed even after completing the path finding of the destination of inner location when a user changes the destination of inner location to another during being guided to the destination, so that the destination of the changed inner location can be newly found using the inner map.

Further, the removal policy also differs from in the indoor map and the outdoor map. For example, according to the removal policy, the inner maps may be preserved up to three inner maps in the storage unit in such a manner that the oldest is replaced with newly downloaded one.

When requested from the input unit 202 to find a path up to a destination, the path finding unit 206 finds the path up to the requested destination from a current location of the user terminal 100. When an outdoor map only is stored in the storage unit 210 and the destination is an indoor location in a building, the path finding unit 206 finds an outdoor path up to the building first. The path finding unit 206 then receives an indoor map of the building through the communication unit 212 and creates an outdoor and indoor linked path to the destination using the indoor map. Alternatively, the path finding unit 206 may try to newly find an indoor path up to the destination from the current location or the path finding unit 206 may try to newly find only an indoor path up to the destination from an access point within a predetermined distance from the building. This will be described with reference to FIG. 3.

In accordance with the embodiment, a user may possess a plurality of user terminals. For example, the user terminals may be a fixed navigation terminal for a vehicle of the user and a portable terminal, e.g., a smart phone. The navigation terminal may be used to find the indoor and outdoor linked path to the destination of the indoor location. The portable terminal such as the smart phone may be used to guide the user to the inner location when the user enters a building of the destination. To do it, the navigation terminal may need to relay the indoor and outdoor linked path or the inner path to the portable terminal.

Figure 3:
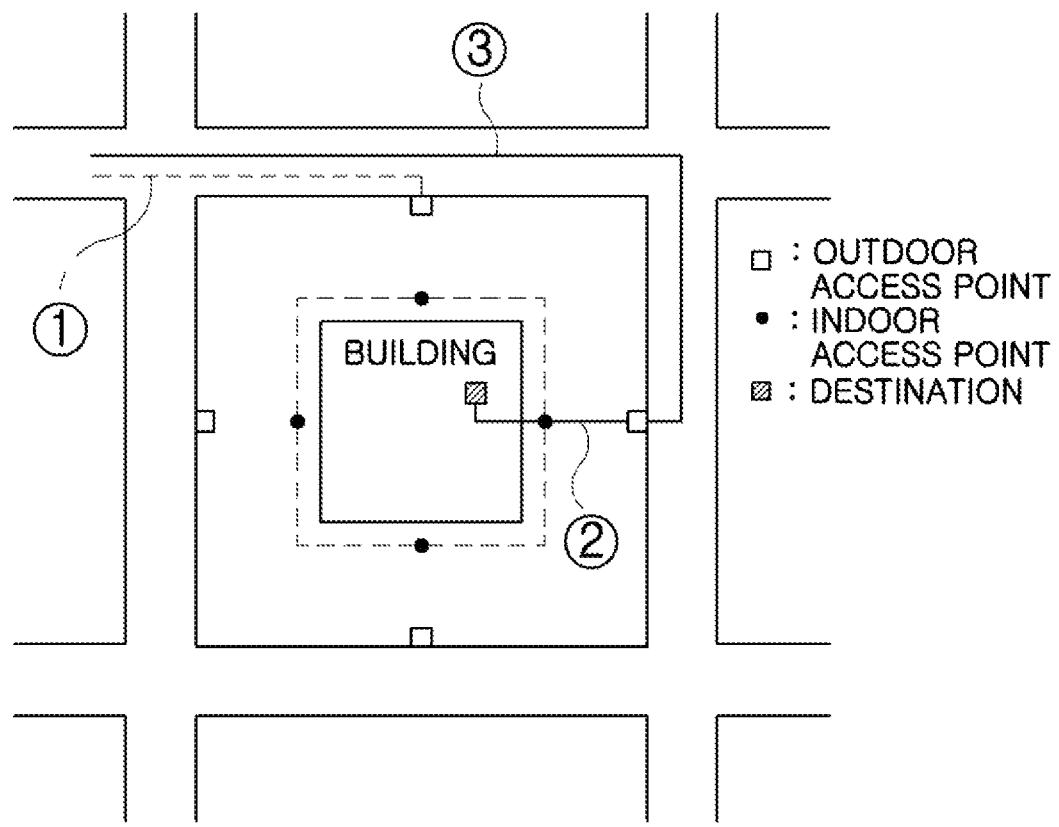
FIG. 3 illustrates a view describing a process to re-find an indoor path using an indoor map by the path finding unit shown in FIG. 1.

FIG. 3 illustrates a view describing a process to re-find a path using the indoor map received from the path finding unit in accordance with an embodiment of the present invention. Hereinafter, the process to re-find an indoor path using an indoor map by the path finding unit will be described in detail in accordance with an embodiment of the present invention.

As shown in FIG. 3, an access point may include a plurality of outdoor access points represented by a small rectangular box and a plurality of indoor access points represented by a dot. An outdoor access point is used to find an outdoor path to the building near the destination using the outdoor map. That is, when a road is positioned outside the building, it is possible to access to the building from different directions as illustrated in FIG. 3 where there are shown 4 (four) external access points, for example.

Meanwhile, an indoor access point may be a location such as a gate of the building, which can be an entry or an exit of a parking lot into which a vehicle goes. In addition, the indoor access point may be a front door through which one can enter a road. Additionally, the indoor access point may include a location where one can enter the building.

As shown in FIG. 3, it is preferred that the outdoor access point and the indoor access point are separated with each other. However, it is noted that the outdoor access point and indoor access point may be partially overlapped if necessary.

The user terminal 100 finds an outdoor path ① up to an outdoor access point of the building near the destination from a current location using the outdoor map stored in the user terminal. The user terminal 100 provides the user with the found outdoor path via the display unit 204, and requests an indoor map of the building to the map server 106. The map server 106 provides the user terminal 100 with the indoor map of the building in response to the request from the user terminal 100.

Thereafter, the user terminal 100 finds an indoor path ② up to an indoor access point of the building from the destination of the indoor location using the indoor map. Thereafter, the user terminal 100 reflects the indoor path from the indoor access point to the destination to the outdoor path, thereby creating an outdoor and indoor linked path ③ from the current location to the indoor access point and in turn the destination. Alternatively, when finding a path up to the indoor access point from the current location, the user terminal may find a path up to the destination by way of a different outdoor access point from the outdoor access point searched already.

The control unit 200 controls components that constitute the user terminal 100. The control unit 200 receives a path finding request input through the input unit 202 and instructs the path finding unit 206 to find the path as requested. As described above, the path finding unit 206 finds an outdoor path up to the building near the destination using the outdoor map stored already and re-finds an indoor path up to the destination of an indoor location using the indoor map.

The path providing unit 208 provides the path searched by the path finding unit 206 to the display unit 206.

Further, the control unit 200 controls the storage unit 210 to store the indoor map received from the map server 106. When the received indoor map is the 2-dimensional indoor map or the 3-dimensional indoor map, the control unit 200 may control so that the received 2-dimensional indoor map or the received 3-dimensional indoor map is separately stored in the storage unit 210.

Figure 4:
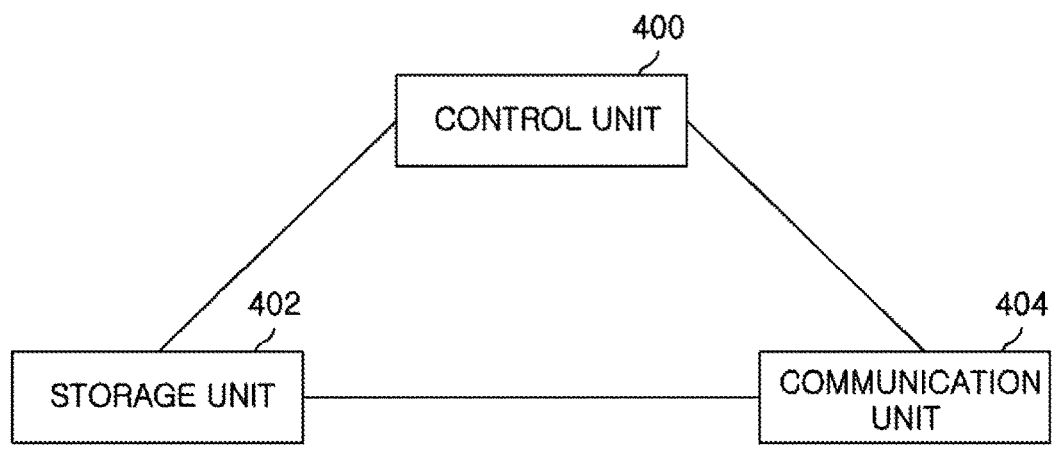
FIG. 4 is a schematic block diagram of the map server shown in FIG. 1.

FIG. 4 is a schematic block diagram of the map server shown in FIG. 1. Hereinafter, the construction of a map server in accordance with an embodiment of the present invention will be described in detail with reference to FIG. 4.

Referring to FIG. 4, the map server 106 includes a control unit 400, a storage unit 402 and a communication unit 404. It is understood that the map server may further include another components other than those shown in FIG. 4.

The communication unit 404 communicates with an external communication apparatus. For example, the communication unit 404 communicates with the user terminal 100 using a mobile communication network or communicates with the user terminal 100 using the positioning device 102. As described above, the communication unit 404 transmits the map data including any one of the indoor map and outdoor map requested by the user terminal 100.

The storage unit 402 stores 2-dimensional map data and 3-dimensional map data. The 2-dimensional and 3-dimensional map data may be stored in separated storage spaces. The storage unit 402 stores location information of the positioning device 102. That is, the storage unit 402 stores location information of the positioning device installed in each building and location information of the positioning device installed at a position which is outside each building. Additionally, the storage unit 402 may store a variety of information needed to drive the map server and requested by the user terminal.

The control unit 400 controls operations of the respective components which constitute the map server 106. Further, when the user terminal 100 enters a building having the destination of the indoor location, the control unit 400 automatically provides the user terminal with the indoor map of the building or provides the user terminal with the indoor map to enable the user terminal to find the indoor path. That is, the control unit 400 may provides the indoor map of the building in advance to the user terminal even when the user terminal does not yet enter the building. When the control unit 400 provides the indoor map of the building, it provides the user terminal with a 2-dimensional map of which amount of data is relatively small first and then a 3-dimensional map. It is also understood that the control unit may transmit the indoor map to the user terminal in different methods from the above described method.

Figure 5:
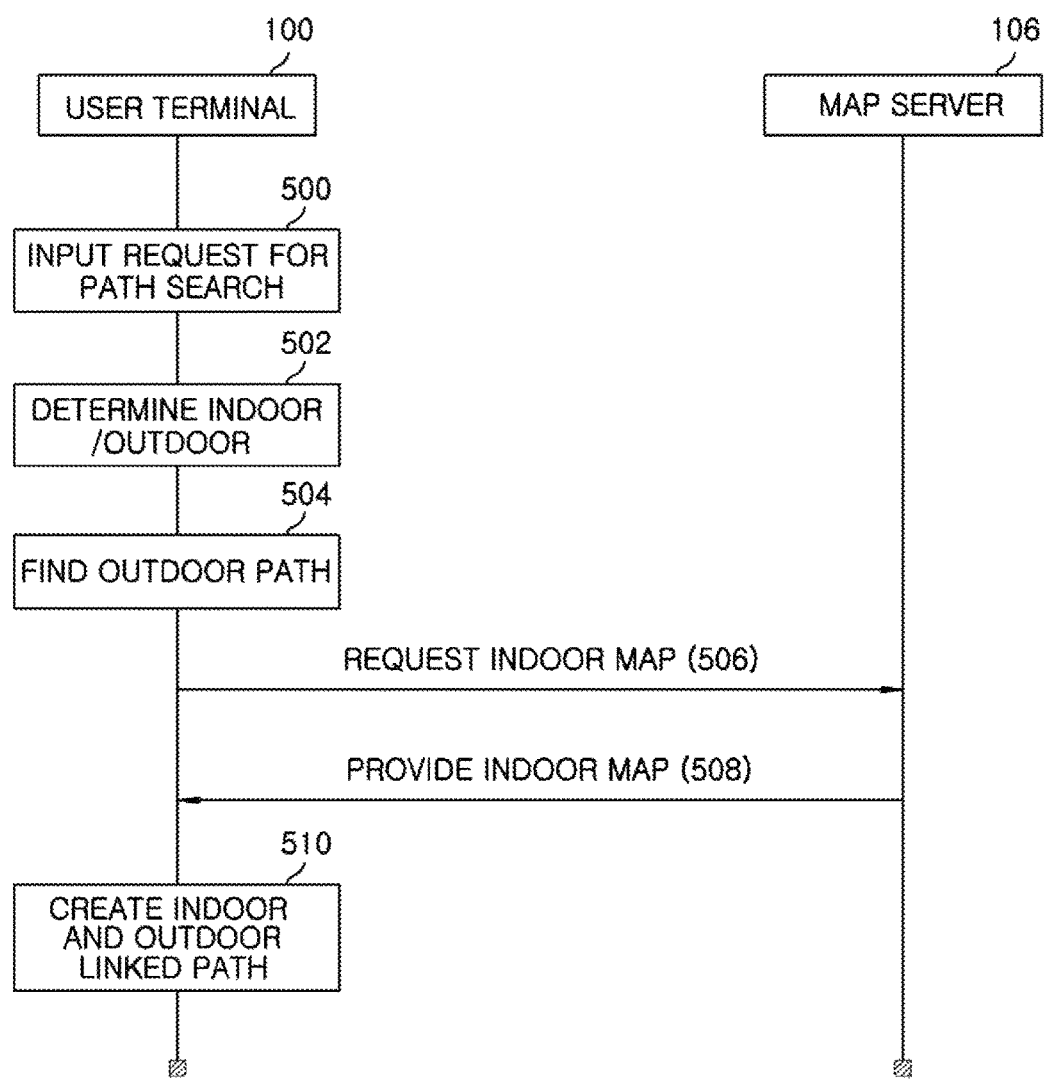
FIG. 5 is a sequential diagram illustrating a process of creating an indoor and outdoor linked path in accordance with an embodiment of the present invention.

FIG. 5 is a sequential diagram illustrating a process of creating an indoor and outdoor linked path in accordance with an embodiment of the present invention. Hereinafter, the process of creating an indoor and outdoor linked path performed between the user terminal and the map server in accordance with an embodiment of the present invention will be described in detail with reference to FIG. 5.

In operation 500, the user terminal 100 is requested to find a path up to a destination from a current location through the input unit 202.

In operation 502, the user terminal 100 determines whether the destination is at an indoor location in a building or an outdoor location. When the destination is at the outdoor location, the user terminal 100 finds an outdoor path using the outdoor map already stored therein.

In operation 504, when the destination is at the indoor location, the user terminal 100 finds an outdoor path using the outdoor map from a current location up to an outdoor access point of the building at which the destination is located.

In operation 506, the user terminal 100 provides the found outdoor path to the display unit 204 of the user terminal 100, and simultaneously requests an indoor map of the building to the map server.

In operation 508, the map server 106 provides the user terminal 100 with the indoor map.

In operation 510, the user terminal 100 stores the indoor map provided from the map server 106 and re-finds an indoor path up to the destination of the indoor location from the current location. Again, the user terminal 100 finds an indoor path up to the indoor access point of the building from the destination using the indoor map. The user terminal then reflects the indoor path to the outdoor path and creates the outdoor and indoor linked path up to the destination of the indoor location from the current location.

Although it has been described and shown in FIG. 5 that the user terminal finds the outdoor and indoor linked path, the map server may directly find the outdoor and indoor linked path as requested by the user terminal. In this case, the user terminal may need to transmit the current location to the map server in real time.

Further, when an indoor map for the destination of an indoor location is stored already in the user terminal, it is possible to directly find an outdoor and indoor linked path up to the destination using the indoor map and the outdoor map.

While the invention has been shown and described with respect to the preferred embodiments, the present invention is not limited thereto. It will be understood by those skilled in the art that various changes and modifications may be made without departing from the scope of the invention as defined in the following claims.

What is claimed is:

1. A method for finding a destination in a user terminal, the method comprising:
   the user terminal determining whether the destination is an outdoor or indoor location;
   when the destination is an indoor location, the user terminal finding an outdoor path up to an outdoor access point of a building in which the destination is located, using an outdoor map, and displaying the found outdoor path on a display unit of the user terminal;
   the user terminal issuing a request to a map server for an indoor map of the building, and receiving an indoor map of the building;
   the user terminal finding an indoor access point and an indoor path up to the destination from the indoor access point of the building using the indoor map; and
   the user terminal reflecting the indoor path to the outdoor path to create an outdoor and indoor linked path at least partially using the found outdoor path;
   wherein the outdoor access point and the indoor access point are separated with each other;
   wherein the outdoor access point and the outdoor path up to the outdoor access point which have been initially found are changed according to the indoor access point when the indoor access point is found;

wherein the indoor access point is determined differently depending on whether a user of the user terminal is traveling by vehicle or on foot;

wherein the outdoor map includes one or more outdoor access points to the building, and the indoor map includes one or more indoor access points to the building; and wherein the indoor map and the outdoor map are separately stored in different storage spaces, respectively, and are deleted according to different criteria including a delete period and a delete process that are set different from each other, and wherein the storage spaces are in the user terminal.

2. A user terminal, comprising:

a storage unit including a first storage storing an outdoor map and a second storage storing an indoor map, wherein the indoor map and the outdoor map are separately stored in different storage spaces, respectively, and are deleted according to different criteria;

a path finding unit configured to find an outdoor path using the outdoor map up to an outdoor access point of a building when the destination is located at an indoor location within the building, find an indoor access point and an indoor path up to the destination from the indoor access point of the building using an indoor map, and reflect the indoor path to the outdoor path to create an outdoor and indoor linked path at least partially using the found outdoor path;

a communication unit configured to request from a map server and receive the indoor map of the building; and a path providing unit configured to provide the outdoor and indoor linked path to a user;

wherein the outdoor access point and the indoor access point are separated with each other;

wherein the outdoor access point and the outdoor path up to the outdoor access point which have been initially found are changed according to the indoor access point when the indoor access point is found;

wherein the indoor access point is determined differently depending on whether a user of the user terminal is traveling by vehicle or on foot; and wherein the storage unit is in the user terminal.

3. The user terminal of claim 2, further comprising an input unit configured to input the destination.

4. The user terminal of claim 3, wherein the outdoor map includes one or more outdoor access points to the building and the indoor map includes one or more one or more indoor access points to the building.

5. A method for finding a destination of an indoor location in a user terminal having an outdoor map, the method comprising:

the user terminal determining whether or not an indoor map of a building at which the destination is located is stored in a storage unit of the user terminal;

when the indoor map is stored, the user terminal finding a path up to the destination using the outdoor map and the indoor map;

when the indoor map is not stored, the user terminal finding an outdoor path up to an outdoor access point of the building using the outdoor map, providing the outdoor path, and requesting the indoor map of the building; and when the indoor map is requested, the user terminal receiving the indoor map, finding an indoor access point and an indoor path up to the destination from the indoor access point using the indoor map, and reflecting the indoor path to the outdoor path to create an outdoor and indoor linked path at least partially using the found outdoor path;

wherein the outdoor access point and the indoor access point are separated with each other;

wherein the outdoor access point and the outdoor path up to the outdoor access point which have been initially found are changed according to the indoor access point when the indoor access point is found;

wherein the indoor access point is determined differently depending on whether a user of the user terminal is traveling by vehicle or on foot; and wherein the indoor map and the outdoor map are separately stored in different storage spaces of the user terminal, respectively, and are deleted according to different criteria including a delete period and a delete process that are set different from each other, and wherein the storage spaces are in the user terminal.

* * * * *